(12) United States Patent
Berbee et al.

(10) Patent No.: US 9,334,348 B2
(45) Date of Patent: May 10, 2016

(54) LOW DENSITY ETHYLENE-BASED POLYMERS WITH EXTRACTS AT LOWER MOLECULAR WEIGHTS

(71) Applicants: Otto J. Berbee, Hulst (NL); Teresa P. Karjala, Lake Jackson, TX (US); Cornelis F. J. den Doelder, Terneuzen (NL); Stefan Hinrichs, Wondelgem (BE)

(72) Inventors: Otto J. Berbee, Hulst (NL); Teresa P. Karjala, Lake Jackson, TX (US); Cornelis F. J. den Doelder, Terneuzen (NL); Stefan Hinrichs, Wondelgem (BE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/360,436

(22) PCT Filed: Nov. 20, 2012

(86) PCT No.: PCT/US2012/066102
§ 371 (c)(1),
(2) Date: May 23, 2014

(87) PCT Pub. No.: WO2013/078224
PCT Pub. Date: May 30, 2013

(65) Prior Publication Data
US 2014/0316096 A1    Oct. 23, 2014

Related U.S. Application Data

(60) Provisional application No. 61/563,186, filed on Nov. 23, 2011, provisional application No. 61/563,190, filed on Jan. 5, 2012.

(51) Int. Cl.
*C08F 210/16* (2006.01)

(52) U.S. Cl.
CPC .................... *C08F 210/16* (2013.01)

(58) Field of Classification Search
CPC ......... C08L 23/08; C08F 10/02; C08F 210/16
USPC ........................................................ 526/352
See application file for complete search history.

(56) References Cited

U.S. PATENT DOCUMENTS

| | | | |
|---|---|---|---|
| 2,153,553 A | 4/1939 | Fawcett et al. | |
| 2,396,791 A | 3/1946 | Krase et al. | |
| 2,897,183 A | 7/1959 | Christl et al. | |
| 3,334,081 A | 8/1967 | Madgwick et al. | |
| 3,657,212 A | 4/1972 | Steigerwald et al. | |
| 3,917,577 A | 11/1975 | Trieschmann et al. | |
| 4,287,262 A | 9/1981 | Engelhard et al. | |
| 6,569,962 B1 | 5/2003 | Zschoch et al. | |
| 6,844,408 B2 | 1/2005 | Gonioukih et al. | |
| 6,949,611 B2 | 9/2005 | Wittkowski et al. | |
| 7,968,659 B2* | 6/2011 | Chai | 526/160 |
| 8,242,220 B2* | 8/2012 | Chai | 526/126 |
| 8,278,393 B2 | 10/2012 | Nummila-Pakarinen et al. | |
| 9,120,880 B2 | 9/2015 | Zschoch et al. | |
| 2003/0114607 A1 | 6/2003 | Donck | |
| 2006/0177675 A1* | 8/2006 | Lehtinen et al. | 428/461 |
| 2007/0225445 A1 | 9/2007 | Nguyen et al. | |
| 2008/0139749 A1* | 6/2008 | Lehtinen et al. | 525/240 |
| 2009/0234082 A1 | 9/2009 | Neilen et al. | |
| 2013/0197168 A1 | 8/2013 | Berbee et al. | |
| 2014/0316094 A1 | 10/2014 | Berbee et al. | |

FOREIGN PATENT DOCUMENTS

| | | |
|---|---|---|
| DE | 2107945 A1 | 8/1972 |
| DE | 120200 | 6/1976 |
| DE | 276598 A3 | 3/1990 |
| EP | 0 069 806 A1 | 1/1983 |
| EP | 0792318 A1 | 9/1997 |
| EP | 0928797 A1 | 7/1999 |
| EP | 2123707 B1 | 10/2010 |
| GB | 1101763 A | 1/1968 |
| GB | 1196183 A | 6/1970 |
| WO | 2005/002744 A1 | 1/2005 |
| WO | 2006/094723 A1 | 9/2006 |
| WO | 2006/096504 | 9/2006 |
| WO | 2007/110127 A1 | 10/2007 |
| WO | 2008/112373 A1 | 9/2008 |
| WO | 2011/075465 A1 | 6/2011 |

OTHER PUBLICATIONS

J. Bosch, "The Introduction of Tubular LDPE to the Extrusion Coating Market and the Specifics of the Product," 12th TAPPI European Place conference, 2009, pp. 1-20.
PCT/US2012/066102 International Search Report dated May 30, 2013.
PCT/US2012/066102 Written Opinion dated May 27, 2014.
PCT/US2012/066102 International Preliminary Report on Patentability dated May 27, 2014.

* cited by examiner

*Primary Examiner* — Rip A Lee

(57) ABSTRACT

The invention provides an ethylene-based polymer comprising the following properties: A) a "weight fraction (w) of molecular weight greater than 106 g/mole, based on the total weight of polymer, and as determined by GPC(abs)," that meets the following relationship: $w<A+B(I2)$, where $A=0.090$, and $B=-4.00\times10-3$ (min/dg); B) a G' value that meets the following relationship: $G'<C+D \log(I2)$, where $C=162$ Pa, and $D=-90.0$ Pa/log (dg/min); C) a melt index (I2) from 1 to 20 dg/min; and D) chloroform extractable that has a maximum Mw(conv) of less than, or equal to, 4,000 g/mole.

15 Claims, 2 Drawing Sheets

LOW DENSITY ETHYLENE-BASED POLYMERS WITH EXTRACTS AT LOWER MOLECULAR WEIGHTS

REFERENCE TO RELATED APPLICATIONS

The present application claims the benefit of U.S. Provisional Application No. 61/563,190, filed on Nov. 23, 2011; U.S. Provisional Application No. 61/563,186, filed on Nov. 23, 2011; and International Application No. PCT/US12/64284, filed on Nov. 9, 2012.

BACKGROUND

Broad molecular weight distribution (MWD) low density polyethylenes (LDPEs) with high molecular weight fractions are desired for good processability (line speed, bubble stability, neck-in, etc.) in pure form, or in blends with linear low density polyethylene (LLDPE) or other polymers. Broad MWD LDPE is made up a range of polymer molecules, including low and high molecular weight polymer molecules. The extractable fraction in such polymers generally increases with an increasing fraction of low molecular weight molecules, and also increases by increasing the short chain branching frequency in the low molecular weight molecules. There is typically a trade-off between the broadness of the MWD and the extractable level. The broad MWD can aid in areas, such as processability of the LDPE during processing operations such as extrusion with lower pressures or better bubble stability when making a blown film. The extractable level is an important parameter for food packaging applications, and low extractables are desirable, since high extractable levels typically lead to smoke formation and/or die build-up during processing of the LDPE. Additionally, the LDPE may be used in food contact applications, and if the extractable levels are too high, the LDPE will not meet Food and Drug Administration (FDA) limits for extractables for non-cook-in and cook-in applications, thereby restricting the use of the LDPE from some applications.

Broad MWD LDPEs can be made in different reactor types, such as autoclave or tube reactors with different distributions of residence times. Due to the broader residence time distribution of an autoclave reactor, it is much easier to make a broad MWD with an ultra high molecular weight polymer fraction in this type of reactor. The broad MWD of an autoclave product, however, does result in a high molecular weight fraction which may adversely affect properties, such as film optics. Broad MWD LDPEs are more difficult to achieve in a tubular reactor due to the plug flow behavior. More extreme process conditions, such as high temperature, low pressure, and/or higher conversion level, etc., have to be applied to obtain a broad MWD in a tubular reactor. These extreme process conditions typically lead to more extractables; however the MWD is free of extreme high molecular weight fractions as seen in broad MWD autoclave-based polymers. There is a need to reduce the extractable levels in very broad MWD tubular products by changing the extractability of the low molecular weight fraction in the polymer, as evidenced by the analysis of the extracted low molecular weight fraction.

International Publication No. WO 2007/110127 discloses an extrusion coating composition comprising an ethylene copolymer. The ethylene copolymer is obtained by a polymerization that takes place in a tubular reactor at a peak temperature between 300° C. and 350° C.

International Publication No. WO 2006/094723 discloses a process for the preparation of a copolymer of ethylene and a monomer copolymerizable therewith. The polymerization takes place in a tubular reactor at a peak temperature between 290° C. and 350° C. The comonomer is a di- or higher functional (meth)acrylate, and the comonomer is used in an amount between 0.008 mol % and 0.200 mol %, relative to the amount of ethylene copolymer. The di- or higher functional (meth)acrylate is capable of acting as a crosslinking agent.

European Patent EP 0928797B1 discloses an ethylene homo or copolymer having a density of between 0.923 and 0.935 g/cc, and a molecular weight distribution Mw/Mn between 3 and 10, and comprising from 0.10 to 0.50 wt % of units derived from a carbonyl group containing compound, based on the total weight of the homopolymer or copolymer.

U.S. Pat. No. 3,334,081 discloses a continuous process for the production of polymers of ethylene as carried out in a tubular reactor, whereby the polymer is obtained at a higher conversion rate. In one embodiment, this patent discloses a continuous process for the polymerization of ethylene in a tubular reactor at a pressure of at least about 15,000 psig, and a temperature from about 90° C. to about 350° C., in the presence of a free radical initiator.

U.S. Pat. No. 3,657,212 discloses the production of ethylene homopolymers having a specific density, by polymerization of ethylene, under the action of organic peroxides and oxygen as free-radical-generating polymerization initiators, and of polymerization modifiers, at elevated temperature and superatmospheric pressure, in a tubular reactor having two successive reaction zones. A mixture of ethylene, polymerization initiator, and polymerization modifier are introduced continuously at the beginning of each reaction zone. The ethylene homopolymers have a broad molecular weight distribution, but are said to be practically devoid of very high molecular weight constituents.

Additional polymerizations and/or resins are described in the following: U.S. Pat. Nos. 2,153,553; 2,897,183; 2,396,791; 3,917,577; 4,287,262; 6,569,962; 6,844,408; 6,949,611; U.S. Publication Nos. 2007/0225445; 2003/0114607; US2009/0234082; International Publication Nos. WO 2012/044504; WO 2011/075465; WO 2008/112373; WO 2006/096504; WO 2007/110127; GB1101763; GB1196183; DD120200; DD276598A3; DE2107945; EP0069806A1; CA2541180; EP1777238B1; EP0792318B1; EP2123707A1; and J. Bosch, "The Introduction of Tubular LDPE to the Extrusion Coating Market and the Specifics of the Product," 12$^{th}$ TAPPI European PLACE conference, 2009, pages 1-20.

Two-zone tubular reactor systems, as commonly used in the above art, lead to polymers with either too narrow MWD or too high extractable levels. Achieving broad MWD resins with such reactor systems typically requires extremely high peak temperatures and/or low reactor inlet pressures, and both lead to the formation of lower molecular weight material with increased short chain branching level, which leads to high extractables. Thus, conventional tubular polymerization processes can produce relatively broad MWD polymers, but with high levels of extractables. As discussed above, there remains a need to reduce extractable levels in very broad MWD tubular products. These needs and others have been met by the following invention.

SUMMARY OF INVENTION

The invention provides an ethylene-based polymer comprising the following properties:

A) a "weight fraction (w) of molecular weight greater than $10^6$ g/mole, based on the total weight of polymer, and as determined by GPC(abs)," that meets the following relationship: $w<A+B(I2)$, where $A=0.090$, and $B=-4.00\times10^{-3}$ (min/dg); B) a G' value that meets the following relationship: $G'\geq C+D \log(I2)$, where $C=162$ Pa, and $D=-90.0$ Pa/log (dg/min);

C) a melt index (I2) from 1 to 20 dg/min; and

D) chloroform extractable that has a maximum Mw(conv) of less than, or equal to, 4,000 g/mole.

BRIEF DESCRIPTION OF THE DRAWINGS

As seen in FIG. 1, the notations are as follows: fresh ethylene is fed through line 1; discharge of Primary A is sent through line 2; discharge of Primary B is sent through line 3; 4 and 5 are each a line feed to the Hyper compressor; fresh CTA is fed through each of lines 6 and 7; 8 is a line feed to feed lines 20 and 21, each to the side of the reactor; 9 is a line feed from the Hyper compressor to the front of the reactor; 10 is a line feed from the reactor to the HPS (High Pressure Separator); 11 is a line feed from the HPS to the LPS (Low Pressure Separator); 12 is a discharge line from the LPS; 13 is a line feed from the LPS to the Booster; 14 is a discharge line from the Booster; 15 is a recycle feed line from the HPS to lines 16 and 17 ; 16 is a purge line; 17 is a recycle line; 18 and 19 are recycle lines to the Hyper compressor.

As seen in FIG. 2, the notations are as follows: fresh ethylene is fed through line 1; discharge of Primary A is sent through line 2; discharge of Primary B is sent through line 3; 4 and 5 are each a line feed to the Hyper compressor; fresh CTA is fed through each of lines 6 and 7; 8 is a line feed to feed lines 20 and 21, each to the side of the reactor; 9 is a line feed from the Hyper compressor to the front of the reactor; 10 is a line feed from the reactor to the HPS (High Pressure Separator); 11 is a line feed from the HPS to the LPS (Low Pressure Separator); 12 is a discharge line from the LPS; 13 is a line feed from the LPS to the Booster; 14 is a discharge line from the Booster; 15 is a recycle feed line from the HPS to lines 16 and 17 ; 16 is a purge line; 17 is a recycle line; 18 and 19 are recycle lines to the Hyper compressor.

DETAILED DESCRIPTION

Figure 1:
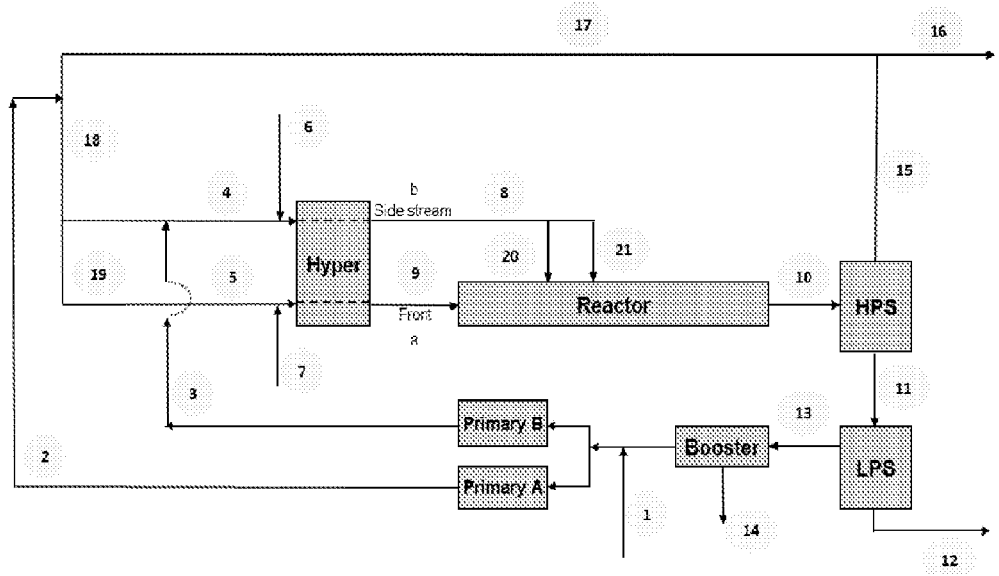
FIG. 1 is a schematic of a polymerization flow scheme.

As discussed above, the invention provides an ethylene-based polymer comprising the following properties:

A) a "weight fraction (w) of molecular weight greater than $10^6$ g/mole, based on the total weight of polymer, and as determined by GPC(abs)," that meets the following relationship: $w<A+B(I2)$, where $A=0.090$, and $B=-4.00\times10^{-3}$ (min/dg); B) a G' value that meets the following relationship: $G'\geq C+D \log(I2)$, where $C=162$ Pa, and $D=-90.0$ Pa/log (dg/min);

C) a melt index (I2) from 1 to 20 dg/min; and

D) chloroform extractable that has a maximum Mw(conv) of less than, or equal to, 4,000 g/mole.

The ethylene-based polymer may comprise a combination of two or more embodiments as described herein.

As used herein, the G' value noted above is G' for G"=500 Pa (at 170° C.).

In one embodiment, the chloroform extractable has a maximum Mw(conv) of less than, or equal to, 3,900 g/mole. The chloroform extractable is determined by the standard test method described herein.

In one embodiment, the chloroform extractable has a maximum Mw(conv) of less than, or equal to, 3,700 g/mole.

In one embodiment, the ethylene-based polymer has an Mw(abs) that meets the following relationships:

i) $Mw(abs)<E+F\times \log(I2)$, where $E=3.50\times10^5$ g/mole, and $F=-1.20\times10^5$ (g/mole)/log (dg/min); and ii) $Mw(abs)>G+H-\log(I2)$, where $G=2.00\times10^5$ g/mole, and $H=-1.20\times10^5$ (g/mole)/log (dg/min).

In one embodiment, the ethylene-based polymer has an "MW(conv)$_{Chloroforom-Q4}$ of the highest 25% molecular weight fraction (fourth quadrant (M1)) in the MWD of the chloroform extract" that is less than, or equal to, 8,400 g/mole. MW(conv) refers to the molecular weight.

In one embodiment, the ethylene-based polymer has an "MW(conv)$_{Chloroforom-Q4}$ of the highest 25% molecular weight fraction (fourth quadrant (M1)) in the MWD of the chloroform extractable" that is less than, or equal to, 8,000 g/mole.

In one embodiment, the ethylene-based polymer has an "MW(conv)$_{Chloroforom-Q4}$ of the highest 25% molecular weight fraction (fourth quadrant (M1)) in the MWD of the chloroform extractable" that is less than, or equal to, 7,600 g/mole.

In one embodiment, the ethylene-based polymer has a hexane extractable that has a maximum Mw(conv) less than, or equal to, 2,300 g/mole, or less than, or equal to, 2,200 g/mole.

In one embodiment, the ethylene-based polymer has an "Mw(conv)$_{hexane-Q4}$ of the highest 25% molecular weight fraction (fourth quadrant (M1)) in the MWD of the hexane extractable" that is less than, or equal to, 4,200 g/mole, or less than, or equal to, 4,000 g/mole.

In one embodiment, the hexane extractable comprises polymer that comprises oxygen-containing end groups, derived from a non-olefinic chain transfer agent (CTA) system, in an amount greater than "0.5 end groups" per 1000 carbon atoms, preferably greater than, or equal to, "0.75 end groups" per 1000 carbon atoms, more preferably greater than, or equal to, "1.0 end groups" per 1000 carbon atoms. In a further embodiment, the CTA system is selected from the following: a ketone, an aldehyde, an ester, an alcohol, or combinations thereof, preferably a ketone, an aldehyde, an alcohol, or combinations thereof, more preferably a ketone, an aldehyde, or combinations thereof. In a further embodiment, the CTA system is selected from the following: propionaldehyde, methyl ethyl ketone, acetone, acetaldehyde, propanol, an alkyl acetate, isopropanol, or combinations thereof.

In one embodiment, the chloroform extractable comprises polymer that comprises oxygen-containing end groups, derived from a non-olefinic CTA system, in an amount greater than "0.5 end groups" per 1000 carbon atoms, preferably greater than, or equal to, "0.75 end groups" per 1000 carbon atoms, more preferably greater than, or equal to, "1.0 end groups" per 1000 carbon atoms. In a further embodiment, the CTA system is selected from the following: a ketone, an aldehyde, an ester, alcohol, or combinations thereof, preferably a ketone, an aldehyde, an alcohol, or combinations thereof; more preferably a ketone, an aldehyde, or combinations thereof. In a further embodiment, the CTA system is selected from the following: propionaldehyde, methyl ethyl ketone, acetone, acetaldehyde, propanol, an alkyl acetate, isopropanol, n-butane, isobutane, or combinations thereof. In another embodiment, the CTA system is selected from the following: propionaldehyde, methyl ethyl ketone, acetone, acetaldehyde, propanol, an alkyl acetate, isopropanol, or combinations thereof.

In one embodiment, the chloroform extractable comprises polymer that comprises vinyl end groups in an amount less than "1.0 vinyl" per 1000 carbon atoms. In a further embodiment, the chloroform extractable comprises polymer that comprises vinyl end groups in an amount less than "0.8 vinyl" per 1000 carbon atoms. In a further embodiment, the chloroform extractable comprises polymer that comprises vinyl end groups in an amount less than "0.6 vinyl" per 1000 carbon atoms.

In one embodiment, the hexane extractable comprises polymer that comprises vinyl end groups in an amount less than "1.0 vinyl" per 1000 carbon atoms. In a further embodiment, the hexane extractable comprises polymer that comprises vinyl end groups in an amount less than "0.8 vinyl" per 1000 carbon atoms. In a further embodiment, the hexane extractable comprises polymer that comprises vinyl end groups in an amount less than "0.6 vinyl" per 1000 carbon atoms.

In one embodiment, the ethylene-based polymer of any of the previous claims, wherein the polymer has a density greater than, or equal to, 0.919 g/cc (1 cc=1 cm$^3$).

In one embodiment, the ethylene-based polymer has a density from 0.916 to 0.930 g/cc.

In one embodiment, the ethylene-based polymer has a density from 0.918 to 0.930 g/cc.

In one embodiment, the ethylene-based polymer comprises less than 5 wt % comonomer, based on the weight of the polymer. In a further embodiment, the ethylene-based polymer comprises less than 2 wt % comonomer, based on the weight of the polymer. In a further embodiment, the ethylene-based polymer comprises less than 1 wt % comonomer, based on the weight of the polymer (wt %=weight percent).

An inventive ethylene-based polymer may comprise a combination of two or more embodiments as described herein.

In one embodiment, the ethylene-based polymer is selected from a polyethylene homopolymer or an ethylene-based interpolymer.

In one embodiment, the ethylene-based polymer is selected from a polyethylene homopolymer or an ethylene-based copolymer; and wherein the comonomer of the ethylene-based copolymer is selected from vinyl acetate, an alkyl acrylate, carbon monoxide (CO), acrylic acid, a carboxylic acid-containing comonomer, a mono-olefin, di-olefin, or polyene. In a further embodiment, the comonomer is present in an amount from 0.5 to 10 wt % comonomer, based on the weight of copolymer.

In one embodiment, the ethylene-based polymer is a polyethylene homopolymer.

In one embodiment, the ethylene-based polymer is an ethylene-based copolymer; and wherein the comonomer of the ethylene-based copolymer is selected from vinyl acetate, an alkyl acrylate, CO, acrylic acid, a carboxylic acid-containing comonomer, mono-olefin, di-olefin, or polyene. In a further embodiment, the comonomer is selected from vinyl acetate, an alkyl acrylate, acrylic acid, monoolefin, or diolefin.

In one embodiment, the comonomer is present in an amount from 0.5 to 10 wt % comonomer, based on weight of copolymer.

In one embodiment, the ethylene-based polymer has an I2≥1.5 g/10 min.

In one embodiment, the ethylene-based polymer has an I2≥2.0 g/10 min.

In one embodiment, the ethylene-based polymer has an I2≥2.5 g/10 min.

In one embodiment, the ethylene-based polymer has an I2≥3.0 g/10 min.

In one embodiment, the ethylene-based polymer has an I2≤18 g/10 min.

In one embodiment, the ethylene-based polymer has an I2≤15 g/10 min.

In one embodiment, the ethylene-based polymer has an I2≤10 g/10 min.

In one embodiment, the ethylene-based polymer has a G'≥90 Pa. In a further embodiment, the ethylene-based polymer has a G'≥100 Pa.

An inventive ethylene-based polymer may comprise a combination of two or more embodiments as described herein.

The invention also provides a composition comprising an inventive ethylene-based polymer.

In one embodiment, the composition further comprises another ethylene-based polymer.

An inventive composition may comprise a combination of two or more embodiments as described herein.

The invention also provides an article comprising at least one component formed from an inventive composition.

In one embodiment, the article is a film.

In one embodiment, the article is a coating.

An inventive article may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400, more typically from 120 to 360, and even more typically from 150 to 320 MPa.

The polymerization temperature in each tubular reactor zone of the process is typically from 100 to 400, more typically from 130 to 360, and even more typically from 140 to 340° C.

The polymerization temperature in each autoclave reactor zone of the process is typically from 150 to 300, more typically from 165 to 290, and even more typically from 180 to 280° C. One skilled in the art understands that the temperatures in the autoclave are considerably lower and less differentiated than those of the tubular reactor, and thus, more favorable extractable levels are typically observed in polymers produced in autoclave-based reactor systems.

The high pressure process of the present invention used to produce polyethylene homo, co- or interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied should allow high temperature operation in the range from 300° C. to 350° C. Free radical initiators that are generally used include organic peroxides, such as peresters, perketals, peroxy ketones, percarbonates and cyclic multifunctional peroxides. These organic peroxy initiators are used in conventional amounts, typically from 0.005 to 0.2 wt % based on the weight of polymerizable monomers. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain Transfer Agent (CTA)

Chain transfer agents (CTAs) or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of the polymer chains, and, hence the molecular weight, for example, the number average molecular weight, Mn. The melt flow index (MFI or $I_2$) of a polymer, which is related to Mn, is controlled in the same way.

The chain transfer agents used in the process of this invention include, but are not limited to, naphthenic hydrocarbons, aliphatic hydrocarbons, such as, for example, pentane, hexane, cyclohexane, n-butane, and isobutane; ketones such as acetone, diethyl ketone or diamyl ketone; aldehydes such as formaldehyde or acetaldehyde; and saturated aliphatic aldehyde alcohols such as methanol, ethanol, propanol or butanol.

In one embodiment, the ethylene-based polymer is polymerized in the presence of a saturated hydrocarbon comprising four or more carbon atoms.

A further way to influence the melt index includes the build up and control, in the ethylene recycle streams, of incoming ethylene impurities, like methane and ethane, peroxide dissociation products, like tert-butanol, acetone, etc., and/or solvent components used to dilute the initiators. These ethylene impurities, peroxide dissociation products, and/or dilution solvent components can act as chain transfer agents.

Polymers

In one embodiment, the ethylene-based polymers of this invention have a density from 0.914 to 0.930, more typically from 0.916 to 0.930 and even more typically from 0.918 to 0.926, grams per cubic centimeter (g/cc or g/cm³). In one embodiment, the ethylene-based polymers of this invention have a melt index ($I_2$) from 1 to 20, more typically from 1 to 15 and even more typically from 1 to 10, grams per 10 minutes (g/10 min) at 190° C./2.16 kg.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene vinyl silane (EVS), ethylene vinyl trimethyl silane (EVTMS), and other copolymers made with "silane-containing" comonomers, and ethylene carbon monoxide (ECO). Other suitable comonomers are described in Ehrlich, P.; Mortimer, G. A.; Adv. Polymer Science; Fundamentals of Free-radical Polymerization of Ethylene; Vol. 7, pp. 386-448 (1970).

Monomer and Comonomers

The term ethylene interpolymer as used in the present description and the claims refers to polymers of ethylene and one or more comonomers. Suitable comonomers to be used in the ethylene polymers of the present invention include, but are not limited to, ethylenically unsaturated monomers and especially $C_{3-20}$ alpha-olefins, diolefins, polyenes carbon monoxide, vinyl acetate, and $C_{2-6}$ alkyl acrylates.

Blends

The inventive polymers can be blended with one or more other polymers, such as, but not limited to, linear low density polyethylene (LLDPE) or LDPE; copolymers of ethylene with one or more alpha-olefins, such as, but not limited to, propylene, butene-1, pentene-1,4-methylpentene-1, pentene-1, hexene-1 and octene-1; high density polyethylene (HDPE), such as HDPE grades HD 940-970 available from The Dow Chemical Company. The amount of inventive polymer in the blend can vary widely, but typically it is from 10 to 90, or from 15 to 85, or from 20 to 80, weight percent, based on the weight of the polymers in the blend.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; and tackifiers or oil extenders, including paraffinic or napthelenic oils.

Applications

An inventive composition may be employed in a variety of conventional thermoplastic fabrication processes to produce useful articles, including, for example, films;

molded articles, such as blow molded, injection molded, or rotomolded articles; foams; wire and cable, fibers, extrusion coatings, and woven or non-woven fabrics.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer and, optionally, may comprise at least one comonomer.

The term "ethylene-based interpolymer" or "ethylene interpolymer" refers to an interpolymer that comprises a majority amount of polymerized ethylene, based on the weight of the interpolymer, and comprises at least one comonomer.

The term "ethylene-based copolymer" or "ethylene copolymer" refers to an interpolymer that comprises a majority amount of polymerized ethylene, based on the weight of the copolymer, and only one comonomer (thus, only two monomer types).

The terms "autoclave-based products" or "autoclave-based polymers," as used herein, refers to polymers prepared in autoclave, autoclave/autoclave, or a reactor system comprising an autoclave and a tubular reactor.

The term "CTA system" includes a single CTA or a mixture of CTAs added to the polymerization process, typically to control the melt index. A CTA system includes a component able to transfer a hydrogen atom to a growing polymer molecule containing a radical, by which a radical is formed on the CTA molecule, which can then initiate a new polymer chain. In a preferred embodiment, each CTA system comprises a single CTA type.

The term "non-olefinic CTA system," as used herein, refers to CTA types that lack carbon-carbon double bonds and carbon-carbon triple bonds, such as, for example, isobutane, ethanol, isopropanol, acetone, propane, and others.

The term "oxygen-containing end groups derived from a non-olefinic CTA system," as used herein, refers to one or more polymer end groups, each comprising at least one oxygen atom, and which is derived from a non-olefinic CTA system that comprises at least one oxygen atom, or derived from a non-olefinic peroxide dissociation product.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt index: Melt index, or $I_2$, (grams/10 minutes or dg/min) is measured in accordance with ASTM D 1238, Condition 190° C./2.16 kg.

Triple Detector Gel Permeation Chromatography (TDGPC): High temperature TDGPC analysis is performed on an ALLIANCE GPCV2000 instrument (Waters Corp.) set at 145° C. The flow rate for the GPC is 1 mL/min. The injection volume is 218.5 µL. The column set consists of four, Mixed-A columns (20-µm particles; 7.5×300 mm; Polymer Laboratories Ltd).

Detection is achieved by using an IR4 detector from PolymerChAR, equipped with a CH-sensor; a Wyatt Technology Dawn DSP Multi-Angle Light Scattering (MALS) detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 g/mol and polydispersity (molecular weight distribution, Mw/Mn) of 1.11. A specific refractive index increment (dn/dc) of −0.104 mL/mg, for polyethylene in 1,2,4-trichlorobenzene (TCB), is used.

The conventional GPC calibration is done with 20 narrow MWD, polystyrene (PS) standards (Polymer Laboratories Ltd.) with molecular weights in the range 580-7,500,000 g/mol. The polystyrene standard peak molecular weights are converted to polyethylene molecular weights using the following equation:

$$M_{polyethylene} = A \times (M_{polystyrene})^B,$$

with A=0.39 and B=1. The value of A is determined by using a linear high density polyethylene homopolymer (HDPE) with Mw of 115,000 g/mol. The HDPE reference material is also used to calibrate the IR detector and viscometer by assuming 100% mass recovery and an intrinsic viscosity of 1.873 dL/g.

Distilled "Baker Analyzed" grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the TDGPC experiment. HDPE SRM 1483 is obtained from the U.S. National Institute of Standards and Technology (Gaithersburg, Md., USA).

LDPE solutions are prepared by dissolving the samples under gentle stirring for three hours at 160° C. The PS standards are dissolved under the same conditions for 30 minutes. The sample concentration is 1.5 mg/mL, and the polystyrene concentrations are 0.2 mg/mL.

A MALS detector measures the scattered signal from polymers or particles in a sample under different scattering angles θ. The basic light scattering equation (from M. Anderson, B. Wittgren, K.- G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)},$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and λ is the wavelength of the incident light. Calculation of the molecular weight and radius of gyration from the light scattering data requires extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from the initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. the absolute weight average molecular weight Mw(abs), and absolute molecular weight distribution (e.g., Mw(abs)/Mn(abs)) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

The obtained MWD(abs) curve from TDGPC is summarized with three characteristic parameters: the absolute weight average molecular weight Mw(abs), the absolute number average molecular weight Mn(abs), and w, where w is defined as "weight fraction of molecular weight greater than $10^6$ g/mole, based on the total weight of polymer, and as determined by GPC(abs)."

Figure 3:
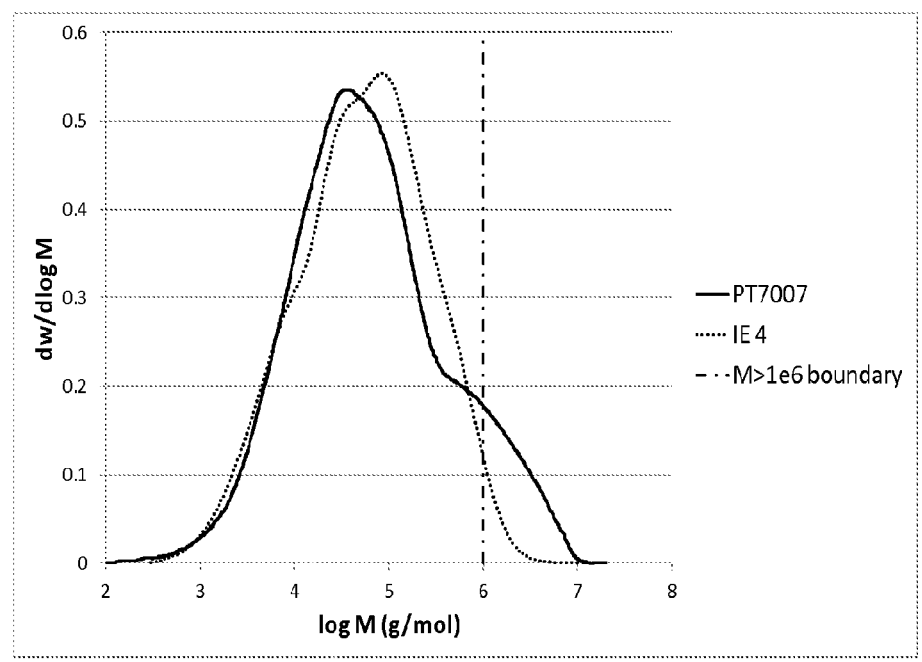
FIG. 3 depicts GPC chromatograms for an inventive LDPE (IE 4) and comparative LDPE (PT7007) polymers.

FIG. 3 shows the MWD(abs) for comparative example PT7007 and Inventive Example 4. In addition, a vertical line, as shown in this figure, indicates the lower integration limit to determine "w." Thus, "w" effectively is the area under the curve to the right of this vertical line.

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M},$$

and $$w = \int_{6}^{\infty} \frac{dw}{d\log M} d\log M.$$

Conventional Gel Permeation Chromatography (GPC)

The conventional molecular weight and molecular weight distribution data were obtained from a high temperature gel permeation chromatography system (Model PL-220 from Polymer Laboratories Inc, now Agilent). The column and carousel compartments were operated at 140° C. Three "10-μm" Mixed-B columns (Agilent) were used with 1,2,4-trichlorobenzene (TCB). The polymer extract samples were prepared at a "2 mg/mL" concentration, in a TCB solvent, by weighing the samples and adding the calculated amount of TCB via a dosimeter. The samples were dissolved in TCB at 160° C. for one hour. The solvent used to prepare the samples contained "200 ppm" of the antioxidant butylated hydroxytoluene (BHT). The injection volume used was "200 microliters" and the flow rate was 1.0 mL/min.

Calibration of the GPC column set was performed with twenty one narrow molecular weight distribution polystyrene standards with peak molecular weight ranging from 580 to 8,400,000 g/mol (Agilent). The polystyrene standard peak molecular weights were converted to polyethylene molecular weights using the following equation:

$$M_{polyethylene} = A(M_{polystyrene})^B,$$

where M is the molecular weight, A has a value of 0.4316 and B is equal to 1.0 (T. Williams and I. M. Ward, Polymer Letters, Vol. 6, pp. 621-624 (1968)). A third order polynomial was used to fit the logarithmic molecular weight calibration data as a function of elution volume. Polyethylene equivalent molecular weight calculations were performed using the equations shown below.

$$\overline{Mn} = \frac{\sum_{i} Wf_i}{\sum_{i} (Wf_i/M_i)},$$

$$\overline{Mw} = \frac{\sum_{i} (Wf_i * M_i)}{\sum_{i} Wf_i},$$

and $$\overline{Mz} = \frac{\sum_{i} (Wf_i * M_i^2)}{\sum_{i} (Wf_i * M_i)},$$

in which $Wf_i$ is the weight fraction of the i-th component and $M_i$ is the molecular weight of the i-th component.

Determination of Log MW Greater than 3.5

The chromatogram was converted into a molecular weight distribution (MWD) plot of the weight fraction of the measured sample (Wf) versus the molecular weight on a logarithmic scale (log M). Number, weight, and z-average molecular weights were calculated according to the following equations:

$$\overline{Mn} = \frac{\sum_{i} Wf_i}{\sum_{i} (Wf_i/M_i)},$$

$$\overline{Mw} = \frac{\sum_{i} (Wf_i * M_i)}{\sum_{i} Wf_i},$$

and $$\overline{Mz} = \frac{\sum_{i} (Wf_i * M_i^2)}{\sum_{i} (Wf_i * M_i)},$$

in which $Wf_i$ is the weight fraction of the i-th component and $M_i$ is the molecular weight of the i-th component.

The weight fraction of a component with molecular weight higher than a certain logarithmic molecular weight (such as log M>3.5) was calculated using the following equation:

$$f = \frac{\sum\limits_{i}^{j} Wf_j}{\sum\limits_{i} Wf_i},$$

in which, $Wf_j$ is the weight fraction of the j-th component and $M_j$ is the molecular weight of the j-th component with the logarithm of the molecular weight larger than a certain value (such as log M>3.5). $Wf_i$ is defined above.

GPC Quadrant Method

For a baseline subtracted, normalized GPC curve, two n-space vectors, $w_i$ and Log $M_i$, are defined, where n is the number of data points. The vectors $w_i$ and Log $M_i$ are, respectively, the normalized area and logarithm of the molecular weight for the $i^{th}$ slice of the GPC curve. The values of any element for Log $M_i$ is determined by the elution volume of the $i^{th}$ slice ( ), and the value of any element of $w_i$ is determined by the $i^{th}$ slice area, after baseline subtraction, divided by the total area of all slices. The data points are close enough together, in time, that the area of each slice can be approximated by a rectangle whose height is determined (after baseline subtraction) by the mass detector response, and whose width is determined by the sampling frequency.

The normalized GPC curve is divided by weight into four equal sequential parts (four equal parts as determined from the area under the logarithm of the MWD curve), or quartiles, and the antilogarithm of the average logarithm of molecular weight for each quartile is calculated. For each quartile, $M_j$, where j is the quartile number, the antilogarithm of the average logarithm of molecular weight is calculated as follows:

$$M_j = 10^{\left\{4*\sum_{i=a_j}^{b_j} w_i * LogM_i\right\}}$$

$$\sum_{i=a_j}^{b_j} w_i = 0.25$$

The values of $a_j$ and $b_j$ are chosen as the first and last slices of the $j^{th}$ quartile.

Figure 4:
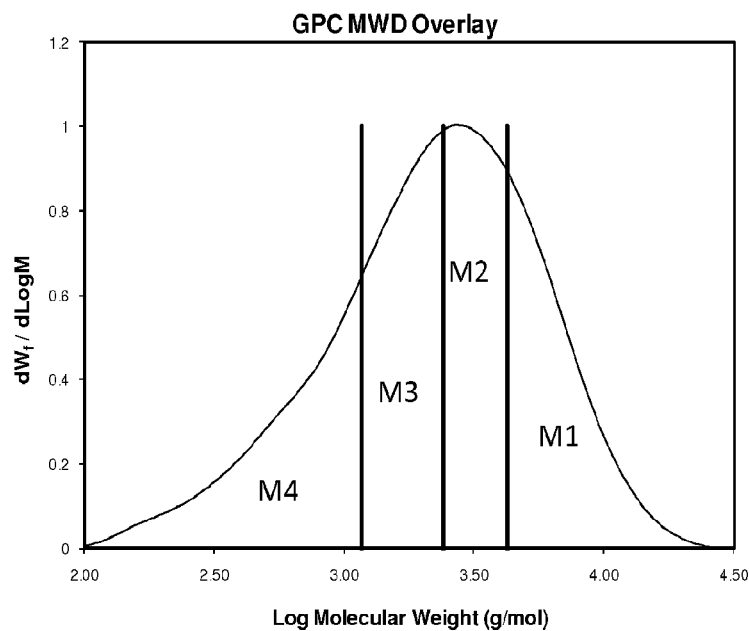
FIG. 4 depicts the distribution of four quadrants in the GPC chromatogram for the chloroform extract for inventive LDPE (IE 3).

Two additional calculations are the overall antilogarithm of the average logarithm of molecular weight, $M_{overall}$ and a ratio. That ratio, $M_{ratio}$, is defined as the antilogarithm of the average logarithm of molecular weight of the first 50 percent of the curve, divided by the antilogarithm of the average logarithm of molecular weight of the second 50 percent of the curve. An example of the four quadrants for Example 3 (inventive) is shown in FIG. 4 (representative figure).

$$M_{overall} = 10^{\left\{\sum_{i=a_1}^{b_4} w_i * LogM_i\right\}}$$

$$\sum_{i=a_1}^{b_4} w_i = 1$$

$$M_{Ratio} = 10^{\left\{2*\sum_{i=a_1}^{b_2} w_i * LogM_i - 2*\sum_{i=a_3}^{b_4} w_i * LogM_i\right\}}$$

$$\sum_{i=a_1}^{b_2} w_i = \sum_{i=a_3}^{b_4} w_i = 0.5$$

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A 25 mm disk was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation Y=C1+C2 ln(x). Using the Orchestrator software, G' at G" equal to 500 Pa was determined by interpolation.

In some cases, the G' (at a G" of 500 Pa) was determined from test temperatures of 150° C. and 190° C. The value at 170° C. was calculated from a linear interpolation from the values at these two temperatures.

Standard Method for Hexane Extractable

Polymer pellets (from the polymerization, pelletization process without further modification approximately 2.2 grams of pellets pressed into a film) were pressed in a Carver Press, at a thickness of 3.0-4.0 mils. The pellets were pressed at 190° C., for three minutes, at 3,000 $lb_f$, and then at 190° C., for three minutes, at 40,000 $lb_f$. Non-residue gloves (PIP* CleanTeam* Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated.

Method for Collection of Soluble Fraction of Hexane Extractables for GPC and Nuclear Magnetic Resonance (NMR)

The above method for "standard hexane extractable" was used. For analytical calculations, and soluble fraction preparation for GPC testing, "2.5" of film was used. For soluble fraction preparation for NMR, "7.5 grams" of film was used.

The remaining hexane, including hexane used for rinse, was reduced down to collect the soluble fraction. Distillation, rotovapping or another equivalent technique for removing solvent, can be used. The hexane was reduced down until 100-150 milliliters of solution remained. The remaining hexane was then transferred to a pre-weighed evaporation dish. The evaporation dish was heated slightly under nitrogen until dry. Once evaporated to dryness, the dish was then transferred to a room temperature vacuum oven for at least 12 hours. The weight of the residue was then calculated to determine the percent hexane extractable. The remaining residue was then analyzed by GPC and NMR.

Standard Method for Chloroform Extractable

A FOSS SOXTEC Avanti 2050 automatic extraction system, with control unit 2050 and drive unit 2050, was used for chloroform extraction. Chloroform with a purity of at least 99% (J. T. Baker code 7386 or equivalent) was used. An amount of 6-8 grams of pellets (from the polymerization, pelletization process without further modification; 25-45 pellets per gram) was weighed into a crucible; 180 mL of solvent (chloroform) was added, and the sample was boiled at a set temperature of 180° C., for a boil time of 3.5 hours. The pellets were submersed in the boiling solvent during the boiling time. After the boiling step, a rinsing step of 3.5 hours was used. The rinse solvent was chloroform. The samples were lifted above the surface of the boiling solvent, which condensed and refluxed back into the crucible; in the mean time, the pellet sample was rinsed at a rate of about 180 drops per minute. After the rinsing step, the chloroform solvent in the crucible was partly recovered by the instrument for further use. The solvent remaining in the crucible was evaporated, and the polymer extract was retained and measured.

Method for Collection of Soluble Fraction of Chloroform Extractables for GPC and Nuclear Magnetic Resonance (NMR)

A FOSS SOXTEC Avanti 2050 automatic extraction, as discussed above for the standard chloroform extraction method, was used. This procedure was used on three film samples, for a total of three extractions. These three extracts of each procedure were combined, and then analyzed by gel permeation chromatography (GPC) and nuclear magnetic resonance (NMR) (for end groups/unsaturation by 1H NMR and branching structure by 13C NMR).

Nuclear Magnetic Resonance (NMR) (Extractables)—1H NMR for End Groups/Unsaturation Sample Preparation The samples were prepared by adding approximately "100 mg of extracted polymer sample" to "3.25 g of tetrachlorethane-d2 with 0.001 M Cr(AcAc)3" in a NORELL "1001-7 10 mm" NMR tube. The samples were purged by bubbling $N_2$ through the solvent, via a pipette inserted into the tube, for approximately five minutes, to prevent oxidation. The samples were then capped, sealed with TEFLON tape, and soaked at room temperature overnight, to facilitate sample dissolution. The samples were kept in a $N_2$ purge box during storage, before, and after preparation, to minimize exposure to $O_2$. The samples were heated and vortexed at 115° C. to ensure homogeneity before analysis.

Data Acquisition Parameters $^1$H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total extracted polymer protons, and a double presaturation experiment, which suppressed the intense polymer backbone peaks and enabled high sensitivity spectra for quantitation of the end-groups. The control was run with a ZG pulse, 16 scans, SWH 10,000 Hz, AQ 1.64 s, $D_1$ 14 s. The double presaturation experiment was run with a modified pulse sequence, lc1prf2.zz1, TD 32768, 100 scans, DS 4, SWH 10,000 Hz, AQ 1.64 s, $D_1$ 1 s, $D_{13}$ 13 s.

Data Analysis: 1H NMR Calculations for Unsaturated Groups Per 1000 C

1. As discussed above, two experiments were run to obtain spectra, a control spectrum to quantitate the total extracted polymer protons, and a double presaturation experiment, which suppressed the intense polymer backbone peaks, and enabled high sensitivity spectra for quantitation of the unsaturation.
2. The signal from residual $^1$H, in TCE-$d_2$ (at 6.0 ppm), was integrated, and set to a value of 100, and the integral from 3 to −0.5 ppm was used as the signal range for the entire extracted polymer in the control experiment. For the presaturation experiment, the TCE signal was also set to 100, and the corresponding integrals for unsaturation (vinylene at about 5.40 to 5.60 ppm, trisubstituted unsaturation at about 5.16 to 5.35 ppm, vinyl at about 4.95 to 5.15 ppm, and vinylidene at about 4.70 to 4.90 ppm) were obtained.
3. In the presaturation experiment spectrum, the regions for cis- and trans-vinylene, trisubstituted, vinyl, and vinylidene were integrated.
4. The integral of the whole polymer from the control experiment was divided by two to obtain a value representing X thousands of carbons (for example, if the polymer integral=28,000, this represents 14,000 carbons, and X=14).
5. Each unsaturated group integral was divided by the corresponding number of protons, contributing to that integral, and this represented the moles of each type of unsaturation per X thousand carbons.
6. The moles of each type of unsaturation were divided by X to give the moles of unsaturated groups per 1000 moles of carbons.

Experimental (13C NMR for SCB (Short Chain Branching)

Sample Preparation: The soluble fraction, for example, the "hexane soluble fraction" samples for 13C NMR were prepared by adding a small amount of concentrated Cr(AcAc)$_3$ solution to the previously prepared 1H sample tubes (to the sample tube that was made and analyzed for 1H NMR, a small amount of Cr in solvent was added to make the Cr concentration correct for the 13C NMR analysis).

This was done by adding approximately "0.25 g of tetrachloroethane-d2 containing 0.116 g Cr(AcAc)$_3$ per g solution," for a final concentration of 0.025 M Cr(AcAc)$_3$. The samples were homogenized by heating the tube and its contents to 150° C., using a heating block and heat gun. Each sample was visually inspected to ensure homogeneity before analysis.

Samples with polar groups originating from polar CTAs, such as propionaldehyde, methyl ethyl ketone (MEK), acetone, or isopropanol, were prepared by adding to the previously prepared 13C sample tubes (as discussed above) "0.2 g DMSO-d6 with 0.025M Cr(AcAc)3", and the samples were remixed. This enabled observation of the ketone chain ends from acetone and propionaldehyde incorporated via chain transfer. Each sample was visually inspected to ensure homogeneity before analysis.

Data Acquisition Parameters: The data were collected using a Bruker 400 MHz spectrometer, equipped with a Bruker Dual DUL high-temperature CryoProbe. The data were acquired using 1280 to 2560 transients per data file, a 6 sec pulse repetition delay, 90 degree flip angles, and inverse gated decoupling with a sample temperature of 120° C. All measurements were made on non-spinning samples in locked mode. Samples were allowed to thermally equilibrate for seven minutes prior to data acquisition. The $^{13}$C NMR chemical shifts were internally referenced to the EEE triad at 30.0 ppm.

Calculations—LDPE Short Chain Branching

LDPE contains many types of branches; for example, 1,3-diethyl, ethyl branches on a quaternary carbon, C4, C5, and if butene or propylene is used, isolated C2 branches (from butene) or C1 (methyl, from propylene) branches are observed. All branching levels were determined by integrating the spectrum from about 40 ppm to 5 ppm, and setting the integral value to 1000, then integrating the peaks associated with each branch type, as shown in the Table A below. The peak integrals then represent the number of each branch type per 1000 C in the extracted polymer. The last column in Table A describes the carbon associated with each integral range.

TABLE A

Branching Type and 13C NMR integral ranges used for quantitation

| Branch Type | Peak(s) integrated | Identity of the integrated carbon peak(s) |
| --- | --- | --- |
| 1,3 diethyl | about 10.5 to 11.5 ppm | 1,3 diethyl branch methyls |
| C2 on quaternary carbon | about 7.5 to 8.5 ppm | 2 ethyl branches on a quaternary carbon, methyls |
| C1 | about 19.75 to 20.50 ppm | C1, methyls |
| C4 | about 23.3 to 23.5 ppm | Second CH$_2$ in a 4-carbon branch, counting the methyl as the first C |
| C5 | about 32.60 to 32.80 ppm | Third CH$_2$ in a 5-carbon branch, counting the methyl as the first C |

Quantitation of Carbonyls

Quantitation of polar end groups resulting from propionaldehyde (PA) or acetone (as CTA or peroxide dissociation products) is done in a manner very similar to the branching as discussed above, with the full spectrum integral set to 1000 C extracted polymer. For PA, the peak at about 24.3 ppm is integrated. These represent the main-chain carbons in the beta position to the carbonyl in the ethyl-ketone chain end. For acetone, the peak at about 44.2 ppm is integrated, which represents the carbon alpha to the carbonyl in the methyl-ketone chain end. The integrals therefore represent carbonyls/1000 C.

EXPERIMENTAL

Example 1

The polymerization was carried out in a tubular reactor with three reaction zones. In each reaction zone, pressurized water was used for cooling and/or heating the reaction medium, by circulating this water through the jacket of the reactor. The inlet-pressure was 2,100 bar, and the pressure drop over the whole tubular reactor system was about 300 bars. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer (see conversion level in Table 3). The non-converted ethylene, and other gaseous components in the reactor outlet, were recycled through high pressure and low pressure recycles, and were compressed and distributed through booster, primary and hyper (secondary) compressors, according to the flow scheme shown in FIG. 1. Organic peroxides (see Table 3) were fed into each reaction zone. Propionaldehyde (PA) was used as a chain transfer agent, and it was present in each reaction zone inlet and originated from the low pressure and high pressure recycle flows (#13 and #15), as well as from freshly injected CTA make-up stream #7 and/or stream #6. In this example, the weight ratio between the "CTA make up" streams #7 and #6 was 0.25.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream (#20), and the reaction was re-initiated by feeding an organic peroxide. This process was repeated at the end of the second reaction zone to enable further polymerization in the third reaction zone. The polymer was extruded and pelletized (about 30 pellets per gram), using a single screw extruder at a melt temperature around 230-250° C. The weight ratio of the ethylene-rich feed streams to the three reaction zones was 1.00:0.75:0.25. The R2 and R3 values were each 0.45. The R values are calculated according to U.S. Provisional Application No. 61/548,996 (International Patent Application PCT/US12/059469). Rn (n=reaction zone number, n>1) is the ratio of "mass fraction of fresh ethylene fed to the first reaction zone (RZ1)" to "mass fraction of fresh ethylene fed to the nth reaction zone (RZn)" is (Rn=RZ1/RZn). The internal process velocity was approximately 12.5, 9, and 11 msec for respectively the $1^{st}$, $2^{nd}$, and $3^{rd}$ reaction zone. Additional information can be found in Tables 2 and 3.

Example 2

The polymerization was carried out in a tubular reactor with three reaction zones, as discussed previously. All process conditions are the same as for Example 1, except the initiator composition was changed. In this example, additional TETMP, as described in Table 1, was used as initiator. The R2 and R3 values were each 0.46.

Comparative Example A

Figure 2:
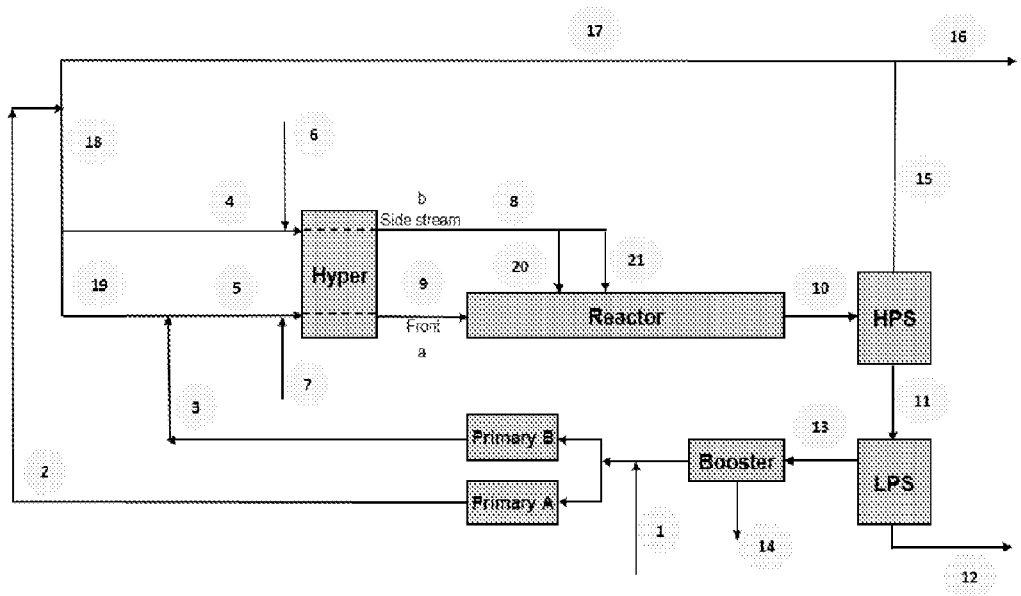
FIG. 2 is a schematic of a polymerization flow scheme.

The polymerization was carried out in a tubular reactor with three reaction zones, as discussed previously. The non-converted ethylene, and other gaseous components in the reactor outlet, were recycled through the high pressure and low pressure recycle streams, and were compressed and distributed through the booster, primary and hyper (secondary) compressors according to flow scheme 2 as shown in FIG. 2.

In each reaction zone, the polymerization was initiated with organic peroxides as described in Example 2. After reaching the first peak temperature in reaction zone 1, the reaction medium was cooled down with pressurized water. At the outlet of the first reaction zone, the reaction medium was further cooled by injecting a fresh, cold ethylene-rich feed stream (#20), and the reaction was initiated again by feeding organic peroxide into the reaction zone. This process was repeated at the end of the second reaction zone, to enable further polymerization in the third reaction zone. The peak temperatures were 330/319/306° C., respectively.

The weight ratio of the ethylene-rich feed streams to the three reaction zones was 1.00:0.75:0.25. For the chain transfer agent, propylene was used, and it was present in each reactor inlet originating from the low and high pressure recycle flows (#13 and #15), as well as from freshly injected CTA make-up stream #7 and/or stream #6. The supplied propylene contained a trace amount of propadiene and methylacetylene (sum maximum of 5 mol ppm) in the propylene. Thus, the maximum potential amount of incorporated propadiene and/or methylacetylene in the polymer is far less than 1 mole ppm.

In this comparative example, the weight ratio of the CTA make-up streams #7 and #≠was 1.00. Due to the higher peak temperature conditions, the CTA consumption was significantly reduced versus Example 1. The R2 and R3 values were each 2.22. Additional information can be found in Table 2 and 3.

Example 4

The polymerization was run according to the description for Example A, with the following changes. The last peak temperature was increased to 310° C., the CTA was acetone, and the melt index was lowered to 3.5 dg/min. The R2 and R3 values were each 2.21. Example 3 was polymerized as discussed for Example 4 above, with the following changes noted in Tables 2 and 3.

TABLE 1

Initiators

| Initiator | Abbreviation |
|---|---|
| tert-Butyl peroxy-2-ethyl hexanoate | TBPO |
| Di-tert-butyl peroxide | DTBP |
| 3,6,9-triethyl 3,6,9-trimethyl 1,4,7-peroxonane | TETMP |

TABLE 3

Additional process information (PA = propionaldehyde)

| LDPE Exs. | Peroxides | CTA | MI (I2) dg/min | R2 and R3 Value* | Conversion % |
|---|---|---|---|---|---|
| 1 | TBPO/DTBP | PA | 6.6 | 0.45 | 32.0 |
| 2 | TBPO/DTBP/ TETMP | PA | 6.9 | 0.46 | 32.7 |
| A | TBPO/DTBP/ TETMP | Propylene | 5.2 | 2.22 | 31.3 |
| 3 | TBPO/DTBP/ TETMP | Acetone | 5.4 | 2.21 | 31.8 |
| 4 | TBPO/DTBP/ TETMP | Acetone | 3.5 | 2.21 | 31.8 |

*When R2 and R3 are each greater than 1, the flow scheme in FIG. 2 was used. When R2 and R3 are each less than 1, the flow scheme in FIG. 1 was used.

The inventive examples (IE) and comparative examples (CE) are listed in Table 4. GPC properties and other properties are listed in Tables 5-11. Results from end group analyses are listed in Table 12. Representative TDGPC profiles are shown in FIG. 3 (whole polymer) and a conventional GPC profile is shown in FIG. 4 (extract).

TABLE 2

Pressure and temperature conditions

| LDPE Exs. | Type | Inlet-pressure/ bar | Start-temp./ ° C. | reinitiation temp. 2nd zone/° C. | reinitiation temp. 3rd zone/° C. | 1st Peak temp./ ° C. | 2nd Peak temp./ ° C. | 3rd Peak temp./ ° C. |
|---|---|---|---|---|---|---|---|---|
| 1 | Inv. | 2100 | 140 | 148 | 226 | 325 | 319 | 310 |
| 2 | Inv. | 2100 | 140 | 150 | 228 | 323 | 319 | 310 |
| A | Comp | 2100 | 140 | 151 | 231 | 330 | 319 | 306 |
| 3 | Inv. | 2100 | 140 | 152 | 230 | 330 | 321 | 307 |
| 4 | Inv. | 2100 | 140 | 154 | 234 | 330 | 321 | 310 |

TABLE 4

Inventive and comparative polymer characterization data

| LDPE | Type** | I2 (dg/min) | Measured Density (g/cc) | Mw(abs) (kg/mol) by TDGPC | Mw(abs)/Mn(abs) by TDGPC | G' (Pa) at 170° C. and G" = 500 Pa | w (>10$^6$ g/mol) | Hexane Extractable or Extract (wt %)$^v$ | Chloroform Extractable or Extract (wt %)$^w$ | Mw (conv) in hexane extract (g/mol)$^x$ |
|---|---|---|---|---|---|---|---|---|---|---|
| PG7004* | CE, AC | 4.1 | 0.9215 | >300 | >20 | 146 | | | | NA |
| PT7007* | CE, AC | 7.5 | 0.9174 | 355 | 26.1 | 129 | 0.097 | 1.9 | 3.4 | NA |
| PT7009* | CE, AC | 8.7 | 0.9188 | 346 | 23.5 | 120 | 0.094 | 1.8 | 3.4 | NA |
| LDPE 160C*** | CE, tub | 6.4 | 0.9175 | 289 | 25.9 | 110 | 0.052 | 4.8 | 8.9 | 2,391 |
| SABIC nExCoat 5*$^u$ | CE, tub X-Link | 4.6 | 0.9170 | 217 | — | 149 | 0.039 | 3.3 | 14.1 | 2,399 |
| LD310E*$^t$ | CE, tub | 0.7 | 0.9231 | 144 | 8.3 | — | 0.018 | <1.5 | 1.6 | NA |
| LD410E*$^t$ | CE, tub | 2.0 | 0.9242 | 121 | 6.7 | 89$^s$ | 0.009 | <1.5 | 1.2 | NA |
| LD450E*$^t$ | CE, tub | 2.0 | 0.9231 | 130 | 7.8 | 113$^s$ | 0.014 | <1.5 | 2.0 | NA |
| 1 | IE, tub | 6.6 | 0.9213 | 124 | 10.2 | 98 | 0.005 | 2.3 | 3.3 | 1,906 |
| 2 | IE, tub | 6.9 | 0.9209 | 127 | 8.9 | 93 | 0.010 | 2.5 | 4.2 | 1,838 |
| A | CE, tub | 5.2 | 0.9177 | 133 | 11.6 | 113 | 0.014 | 3.5 | 8.3 | 2,566 |
| 3 | IE, tub | 5.4 | 0.9207 | 140 | 11.1 | 113 | 0.018 | 2.9 | 4.9 | 2,103 |
| 4 | IE, tub | 3.5 | 0.9196 | 157 | 10.7 | 126 | 0.024 | 3.0 | 4.7 | 2,082 |

*Commercial Polymers
**CE: Comparative Example; IE: Inventive Example; AC: Autoclave-based; tub X-Link: Tubular Crosslinked; tub: Tubular.
***Former Dow LDPE 160C
$^s$"170° C. data" is interpolated from 150° C. and 190° C. data.
$^t$Available from The Dow Chemical Company.
$^u$Propylene-analyzed CTA (by 13C NMR);
$^v$Standard Hexane Extraction Method;
$^w$Standard Chloroform Extraction Method;
$^x$"Collect soluble hexane fraction" method for GPC.

TABLE 5

Inventive and comparative polymer: Claim boundaries corrected for I2

| LDPE | Type | Mw(abs) v. I2 Lower limit$^a$ | Mw(abs) v. I2 Upper limit$^b$ | G' vs. I2 Lower limit$^c$ | Weight fraction vs. I2 Upper limit$^d$ |
|---|---|---|---|---|---|
| PG7004 | CE, AC | 126 | [276] | 106.8 | [0.074] |
| PT7007 | CE, AC | 95 | [245] | 83.2 | [0.060] |
| PT7009 | CE, AC | 87 | [237] | 77.4 | [0.055] |
| LDPE 160C | CE, tub | 103 | [253] | 89.4 | 0.064 |
| SABIC nExCoat 5 | CE, tub X-Link | 120 | 270 | 102.4 | 0.072 |
| LD310E | CE, tub | [219] | 369 | [175.9] | 0.087 |
| LD410E | CE, tub | [164] | 314 | [134.9] | 0.082 |
| LD450E | CE, tub | [164] | 314 | [134.9] | 0.082 |
| 1 | IE, tub | 102 | 252 | 88.2 | 0.064 |
| 2 | IE, tub | 99 | 249 | 86.5 | 0.062 |
| A | CE, tub | 114 | 264 | 97.6 | 0.069 |
| 3 | IE, tub | 112 | 262 | 96.1 | 0.068 |
| 4 | IE, tub | 135 | 285 | 113.0 | 0.076 |

$^a$Mw(abs) < E + Fxlog(I2), where E = 3.50 × 10$^5$ g/mole, and F = −1.20 × 10$^5$ (g/mole)/log(dg/min).
$^b$Mw(abs) > G + Hxlog(I2), where G = 2.00 × 10$^5$ g/mole, and H = −1.20 × 10$^5$ (g/mole)/log(dg/min).
$^c$G' ≥ C + Dlog(I2), where C = 162 Pa, and D = −90.0 Pa/log(dg/min).
$^d$w < A + B(I2), where A = 0.090, and B = −4.00 × 10$^{-3}$ (min/dg).

TABLE 6

Chloroform extractable results (conventional GPC molecular weight moments)

| LDPE | Mn (g/mol) | Mw (g/mol) | Mz (g/mol) | Mw/Mn |
|---|---|---|---|---|
| LDPE 160C | 1,420 | 4,086 | 8,149 | 2.88 |
| SABIC nExCoat 5 | 2,404 | 8,904 | 21,194 | 3.70 |
| 2 | 1,506 | 3,585 | 6,455 | 2.38 |
| A | 1,808 | 5,160 | 10,362 | 2.85 |
| 3 | 1,312 | 3,234 | 5,897 | 2.47 |
| 4 | 1,330 | 3,029 | 5,250 | 2.28 |

TABLE 7

Chloroform extractable results (conventional GPC quadrant data)*

| LDPE | M1 | M2 | M3 | M4 | Whole | 50% Ratio or Mratio |
|---|---|---|---|---|---|---|
| LDPE 160C | 8,832 | 3,878 | 1,993 | 634 | 2,542 | 4.84 |
| SABIC nExCoat 5 | 20,223 | 7,678 | 3,654 | 1,085 | 4,947 | 5.89 |
| 2 | 7,359 | 3,532 | 1,963 | 687 | 2,420 | 4.11 |
| A | 11,096 | 4,814 | 2,518 | 833 | 3,242 | 4.75 |
| 3 | 6,773 | 3,184 | 1,725 | 595 | 2,156 | 4.29 |
| 4 | 6,154 | 3,021 | 1,722 | 626 | 2,109 | 3.91 |

*See FIG. 4 for representative GPC profile.

TABLE 8

Chloroform extractable results (weight fraction of a polymer less than a given log molecular weight in g/mol)

| LDPE | Log M < 2.5 | Log M < 3.0 | Log M < 3.5 | Log M < 4.0 | Log M < 4.5 | Log M < 5.0 |
|---|---|---|---|---|---|---|
| LDPE 160C | 0.035 | 0.179 | 0.548 | 0.919 | 0.999 | 1.000 |
| SABIC NEXCOAT | 0.016 | 0.089 | 0.323 | 0.714 | 0.959 | 1.000 |
| 2 | 0.026 | 0.163 | 0.572 | 0.954 | 1.000 | 1.000 |
| A | 0.022 | 0.126 | 0.454 | 0.871 | 0.996 | 1.000 |
| 3 | 0.036 | 0.201 | 0.621 | 0.964 | 1.000 | 1.000 |
| 4 | 0.032 | 0.188 | 0.645 | 0.976 | 1.000 | 1.000 |

TABLE 9

Hexane extractable results (conventional GPC molecular weight moments)

| LDPE | Mn (g/mol) | Mw (g/mol) | Mz (g/mol) | Mw/Mn |
|---|---|---|---|---|
| LDPE 160C | 1,189 | 2,391 | 3,512 | 2.01 |
| SABIC nExCoat 5 | 1,221 | 2,399 | 3,463 | 1.96 |
| 1 | 972 | 1,906 | 2,765 | 1.96 |
| 2 | 937 | 1,838 | 2,698 | 1.96 |
| A | 1,375 | 2,566 | 3,575 | 1.87 |
| 3 | 1,148 | 2,103 | 2,958 | 1.83 |
| 4 | 1,108 | 2,082 | 2,982 | 1.88 |

TABLE 10

Hexane extractable results (conventional GPC quadrant data)

| LDPE | M1 | M2 | M3 | M4 | Whole | 50% Ratio or Mratio |
|---|---|---|---|---|---|---|
| LDPE 160C | 4,509 | 2,615 | 1,567 | 563 | 1,784 | 3.34 |
| SABIC nExCoat 5 | 4,442 | 2,617 | 1,607 | 579 | 1,807 | 3.23 |
| 1 | 3,549 | 2,097 | 1,264 | 452 | 1,426 | 3.29 |
| 2 | 3,456 | 2,031 | 1,209 | 440 | 1,379 | 3.33 |
| A | 4,671 | 2,841 | 1,809 | 695 | 2,000 | 3.00 |
| 3 | 3,844 | 2,313 | 1,454 | 568 | 1,639 | 3.04 |
| 4 | 3,846 | 2,302 | 1,428 | 538 | 1,600 | 3.13 |

TABLE 11

Hexane extractable results (weight fraction of a polymer less than a given log molecular weight in g/mol)

| LDPE | Log M < 2.5 | Log M < 3.0 | Log M < 3.5 | Log M < 4.0 | Log M < 4.5 |
|---|---|---|---|---|---|
| LDPE 160C | 0.039 | 0.212 | 0.724 | 0.999 | 1.000 |
| SABIC nExCoat 5 | 0.037 | 0.201 | 0.728 | 0.999 | 1.000 |
| 1 | 0.055 | 0.276 | 0.847 | 1.000 | 1.000 |
| 2 | 0.059 | 0.299 | 0.853 | 1.000 | 1.000 |
| A | 0.027 | 0.162 | 0.691 | 0.999 | 1.000 |
| 3 | 0.034 | 0.222 | 0.810 | 1.000 | 1.000 |
| 4 | 0.040 | 0.234 | 0.808 | 0.999 | 1.000 |

TABLE 12

Hexane extraction results (end groups)

| LDPE | C1 (/1000C) | SCB = Σ(C1 to C5) (1/1000C) | # of C per average SCB | # of C in ΣSCB (/1000C) | Vinyl (/1000C) | Total unsaturation (/1000C) | Carbonyl** (1/1000C) |
|---|---|---|---|---|---|---|---|
| LDPE 160C | 0 | 36.8 | 3.0 | 111.6 | 0.5 | 2.7 | 0.8 |
| SABIC nExCoat 5 | 5.2 | 31.6 | 2.8 | 88 | 1.71 | 3.15 | ND* |
| 1 | 0 | 31.0 | 3.1 | 94.9 | 0.3 | 1.7 | 1.9 |
| 2 | 0 | 31.3 | 3.1 | 95.9 | 0.3 | 1.8 | ND* |
| A | 4.9 | 34.8 | 2.8 | 96.7 | 1.4 | 3.1 | ND* |
| 3 | 0 | 30.6 | 3.1 | 95.6 | 0.4 | 1.8 | 1.9 |
| 4 | 0 | 30.3 | 3.1 | 94.6 | 0.5 | 2.2 | 1.6 |

*ND = Non-detectable

**Derived from CTA end group and peroxide dissociation products incorporated in the polymer as an end group.

The comparative, broad MWD, autoclave-based products had measured Mw(abs)/Mn(abs) values above 20, and weight fractions (w) values around 0.09, while the measured G' values were comparable to Inventive Example 4. Inventive Example 4 had a measured Mw(abs)/Mn(abs) value of 11, and a "w" value around 0.02. The large difference in product design between the inventive and autoclave-based polymers was demonstrated in FIG. 3, which shows a higher molecular weight fraction for the autoclave-based product. Thus, the autoclave product had too much ultra high molecular weight fraction, and this fraction did not significantly increase G' compared to the G' values for the inventive polymers, prepared using a tubular reactor. Also, as discussed above, the ultra high molecular weight fractions in the autoclave-based polymers will contribute to the deterioration of optical properties in film applications.

Inventive Examples 1 and 2 had acceptable G' values and excellent hexane and chloroform extractable levels. The extractable levels (hexane and chloroform) approached the values of the autoclave-based, broad MWD polymers, and also the hexane extractable levels should comply with the strict FDA food contact limit of less than, or equal to, 2.6 wt % hexane extractable for cook-in applications ("Polyethylene for Use in Articles that Contact Food Except for Articles Used in Packing or Holding Food During Cooking" in "Olefin Polymers" Code of Federal Regulations, Title 21, Pt. 1520.77; (d)(3)(ii) Option 2, 177.1520(c) Paragraph 2.2 (2001)) and should also meet the 5.5 wt % hexane extractable for non-cook-in applications ("Polyethylene for Use in Articles that Contact Food Except for Articles Used in Packing or Holding Food During Cooking" in "Olefin Polymers" Code of Federal Regulations, Title 21, Pt. 1520.77; (d)(3)(ii) Option 2, 177.1520(c) Paragraph 2.1 (2001).

Comparative Example A and Inventive Example 3 showed good G' performance; however, the extractable levels were strongly influenced by the choice of CTA. Comparative Example A, made with propylene, showed increased hexane extractable level and significantly increased chloroform extractable level, as compared to Inventive Example 3.

Inventive Examples 3 and 4 showed that the extractable level was not significantly affected by lowering the melt index from 5.4 to 3.5; however the lower melt index is favorable for a higher G'value.

Comparative LDPE 160C showed satisfactory G' performance, although the resin design was unbalanced, as shown by the high Mw(abs) value and the unfavorable high hexane and chloroform extractable levels. Comparative SABIC nExCoat 5 showed good G' performance, but increased hexane extractable level (versus the other autoclave-based polymers) and very high chloroform extractable levels.

The analysis of the extractable fraction focused on the composition of extract, expressed by MWD parameters, and the presence of functional groups, like short chain branches, unsaturations, and CTA-derived end groups. The extract consisted mainly of low molecular weight polymer molecules; however one has to realize that, especially in the lower quadrant of MWD of the extract, other process raw materials, like peroxide diluents, solvent and compressor lubrication oil may be present. Therefore, the extractability is preferably judged by considering the "weight average molecular weight" and the quadrant with the highest molecular weight. The analysis data on chloroform extractables are summarized in Tables 6 to 8. FIG. 4 showed the boundaries of the quadrants of the data presented in Table 7 to 8 for Inventive Example 3.

The trends and data for the hexane extractables are given in Tables 9 to 11. Similar trends were observed for hexane extractables as was seen for chloroform extractables. The use of propylene increased the amount of extract (see Table 4), as well as promoted the extraction of higher molecular weight polymer molecules (see Tables 9-11).

The level of functional groups in the hexane extracts was analyzed by NMR, as shown in Table 12. The following data was reported: number of methyl (C1) per 1000 C (methyl originates from the copolymerization of propylene, when propylene is used as CTA); number of short chain branches (SCB) per 1000 C (short chain branches is the sum of methyl, ethyl, butyl and pentyl branches and will include propyl when pentene-1 is used as a CTA); number of carbons per average SCB (methyl contains 1 carbon, ethyl contains 2 carbons, etc.); number of carbons present in short chain branches per 1000 C (this number is calculated by multiplying the number of SCB per 1000 C with the number of carbons per average SCB); vinyl per 1000 C (double bond at the end of a straight chain); total unsaturation per 1000 C (sum of all vinyl, transvinyl and vinylidene unsaturation; these unsaturations influence the molecular weight or melt index, and should be balanced by more or less contribution from the added CTA).

It is known that polymers with a higher level of short chain branching (lower polymer density) and/or lower molecular weight will have higher extractable levels, and will extract higher molecular weight molecules. When comparing the SCB parameters of the Sabic nExCoat 5 sample with the Inventive Examples, one would expect in the hexane extract a higher level of SCBs or a higher number of C in the ΣSCB for the Sabic nExCoat sample; however, despite the extraction of higher molecular weight molecules in the Sabic nExCoat sample, it was discovered that the level of SCBs in this extract was similar to the level in the Inventive Examples, and the number of carbons in the ΣSCB in the extract for the Sabic sample was lower (see Table 12). The average length of the short chain branches is shorter due to the presence of methyl branches, in addition to the standard ethyl, butyl and pentyl branches. The only parameters in the extract of the Sabic sample which differed were the vinyl, the total unsaturation and the carbonyl level. Surprisingly, it has been discovered that, despite the low frequency of vinyls and carbonyls in the extract of the samples, in general, the unsaturation and/or carbonyl levels have a strong impact on the maximum molecular weight that was extracted. From the analyzed data, it has been discovered that for a given level of SCB, the level of maximum molecular weight extracted can be reduced by lowering the unsaturation level and/or increasing the carbonyl level. This lowering of the level of maximum molecular weight extracted will positively affect (reduce) the amount of extract (extractable level) of a polymer. The differences in the level of chloroform and hexane extractables for a given polymer can be explained by the different affinities of chloroform and hexane solvents towards unsaturation and/or carbonyl functionality.

In summary, to achieve broad MWD resins with low extractables, and extracts at lower molecular weight, the polymerization conditions need to be carefully selected and balanced. Important process parameters include maximum polymerization temperatures, reactor pressure, and the type, level and distribution of the chain transfer agent.

The invention claimed is:

1. An ethylene-based polymer comprising the following properties:
    A) a "weight fraction (w) of molecular weight greater than $10^6$ g/mole, based on the total weight of polymer, and as determined by GPC(abs)," that meets the following relationship: $w < A + B(I2)$, where $A = 0.090$, and $B = -4.00 \times 10^{-3}$ (min/dg);

B) a G'(500 Pa, 170° C.) value that meets the following relationship: G'≥C+D log(I2), where C=162 Pa, and D=−90.0 Pa/log (dg/min);

C) a melt index (I2) from 1 to 20 dg/min; and

D) chloroform extractable that has a weight average Mw(conv) of less than, or equal to, 4,000 g/mole.

2. The ethylene-based polymer of claim 1, wherein the polymer further has an Mw(abs) that meets the following relationships:

i) Mw(abs)<E+F×log(I2), where E=3.50×10$^5$ g/mole, and F=−1.20×10$^5$ (g/mole)/log (dg/min); and ii) Mw(abs)>G+H×log(I2), where G=2.00×10$^5$ g/mole, and H=−1.20×10$^5$ (g/mole)/log (dg/min).

3. The ethylene-based polymer of claim 1, wherein the polymer has an "MW(conv)$_{Chloroforom-Q4}$ of the highest 25% molecular weight fraction (fourth quadrant (M1)) in the MWD of the chloroform extractable" that is less than, or equal to, 8,400 g/mole.

4. The ethylene-based polymer of claim 1, wherein the polymer has a hexane extractable that has a Mw(conv) less than, or equal to, 2,300 g/mole.

5. The ethylene-based polymer of claim 1, wherein the polymer has an "MW (conv)$_{hexane-Q4}$ of the highest 25% molecular weight fraction (fourth quadrant (M1)) in the MWD of the hexane extractable" that is less than, or equal to, 4,200 g/mole.

6. The ethylene-based polymer of claim 1, wherein the hexane extractable comprises polymer that comprises oxygen-containing end groups, derived from a non-olefinic CTA system, in an amount greater "0.5 end groups" per 1000 carbon atoms.

7. The ethylene-based polymer of claim 6, wherein the CTA system is selected from the following: a ketone, an aldehyde, an ester, an alcohol, or combinations thereof.

8. The ethylene-based polymer of claim 7, wherein the CTA system is selected from the following: propionaldehyde, methyl ethyl ketone, acetone, acetaldehyde, propanol, an alkyl acetate, isopropanol, or combinations thereof.

9. The ethylene-based polymer of claim 1, wherein the chloroform extractable comprises polymer that comprises oxygen-containing end groups, derived from a non-olefinic CTA system, in an amount greater "0.5 end groups" per 1000 carbon atoms.

10. The ethylene-based polymer of claim 9, wherein the CTA system is selected from the following: a ketone, an aldehyde, an ester, alcohol, or combinations thereof.

11. The ethylene-based polymer of claim 1, wherein the chloroform extractable comprises polymer that comprises vinyl end groups in an amount less than "1.0 vinyl" per 1000 carbon atoms.

12. The ethylene-based polymer of claim 1, wherein the hexane extractable comprises polymer that comprises vinyl end groups in an amount less than "1.0 or vinyl" per 1000 carbon atoms.

13. The ethylene-based polymer of claim 1, wherein the polymer has a density greater than, or equal to, 0.919 g/cc.

14. A composition comprising the ethylene-based polymer of claim 1.

15. An article comprising at least one component formed from the composition of claim 14.

* * * * *